US012781883B2

(12) United States Patent
Ward, Jr. et al.

(10) Patent No.: US 12,781,883 B2
(45) Date of Patent: Nov. 3, 2026

(54) ADAPTER FOR A CONTROL STOP OF A FLUSHOMETER

(71) Applicants: Barry Lee Ward, Jr., White House, TN (US); Frank Joseph D'Allaird, White House, TN (US); Kevin Matthew D'Allaird, Charlotte, NC (US)

(72) Inventors: Barry Lee Ward, Jr., White House, TN (US); Frank Joseph D'Allaird, White House, TN (US); Kevin Matthew D'Allaird, Charlotte, NC (US)

( * ) Notice: Subject to any disclaimer, the term of this patent is extended or adjusted under 35 U.S.C. 154(b) by 22 days.

(21) Appl. No.: 18/965,435

(22) Filed: Dec. 2, 2024

(65) Prior Publication Data

US 2025/0271084 A1 Aug. 28, 2025

Related U.S. Application Data

(60) Provisional application No. 63/558,304, filed on Feb. 27, 2024.

(51) Int. Cl.
*F16L 15/00* (2006.01)
*E03D 3/02* (2006.01)

(52) U.S. Cl.
CPC .............. *F16L 15/007* (2013.01); *E03D 3/02* (2013.01)

(58) Field of Classification Search
CPC ..... F16L 15/007; F16L 21/035; F16L 15/001; F16L 15/006; E03D 3/02
USPC ......................................... 285/390, 392, 386
See application file for complete search history.

(56) References Cited

U.S. PATENT DOCUMENTS 4,477,109 A 10/1984 Kleuver
5,419,363 A * 5/1995 Robinson ................ E03C 1/021 251/148
5,788,291 A 8/1998 Williams et al.
5,931,200 A 8/1999 Mulvey et al.
6,594,849 B1 7/2003 Nimens
7,108,296 B2 * 9/2006 Andre ................... F16L 25/009 285/133.4
7,198,057 B2 4/2007 Zhurin et al.
9,416,523 B2 * 8/2016 Usher ........................ E03D 3/02
9,580,894 B2 2/2017 Paar
10,968,615 B2 * 4/2021 Usher ........................ E03D 3/10
11,274,424 B2 3/2022 Schuster et al.
2003/0028956 A1 2/2003 Pangramuyen (Continued)

*Primary Examiner* — Michael R Reid
(74) *Attorney, Agent, or Firm* — Dunlap Bennett & Ludwig PLLC

(57) ABSTRACT

A conduit adapter for forming a fluid connection between a three-quarter of an inch conduit and a commercial control stop one and one-quarter of an inch coupling threads. The conduit adapter provides a through bore extend between a first end and a second end of the conduit adapter. The first end has a cylindrical fitting dimensioned and configured to fluidly couple to the coupling threads of the control stop. A hood shrouding approximately half of the cylindrical fitting. The second end comprising a male threaded fitting dimensioned for a three-quarters of an inch female fitting of the standard conduit, such as a garden hose. A valve access opening disposed between the hood and the second end, wherein an operatively associated valve can be fluidly connected to the through bore for selectively controlling flow therethrough.

13 Claims, 5 Drawing Sheets

(56) References Cited

U.S. PATENT DOCUMENTS

| | | | |
|---|---|---|---|
| 2003/0042337 | A1 | 3/2003 | Liang et al. |
| 2004/0051303 | A1 | 3/2004 | Lorenz |
| 2011/0056007 | A1 | 3/2011 | Caywood et al. |
| 2014/0041745 | A1 | 2/2014 | Vu |
| 2016/0097474 | A1 | 4/2016 | Settu et al. |
| 2016/0258148 | A1 | 9/2016 | Pant |
| 2016/0361739 | A1 | 12/2016 | Wescott et al. |
| 2017/0356175 | A1 | 12/2017 | Doung |

* cited by examiner

ADAPTER FOR A CONTROL STOP OF A FLUSHOMETER

CROSS-REFERENCE TO RELATED APPLICATION

This application claims the benefit of priority of U.S. provisional application No. 63/558,304, filed 27 Feb. 2024, the contents of which are herein incorporated by reference.

BACKGROUND OF THE INVENTION

The present invention relates to sanitary plumbing and, more particularly, an adapter dimensioned and shaped for fluidly connecting the one and one-quarter inch coupling threads of a flushometer's control stop to a three-quarter inch thread of a conduit, such as a standard garden hose, thereby expediting the repair and maintenance of the flushometer.

A flushometer is a metal water-diverter that uses an inline handle to flush tankless toilets, urinals, or other sanitary fixtures. Besides a handle, the flushometer includes a valve body assembly fluidly coupled to the sanitary fixture and a control stop, which sits between the valve body assembly and the water supply (usually protruding from a nearby wall or supply 'stub out'). The control stop houses a repair kit that can be switched to stop the flow of water from the water supply to the valve body assembly.

After mechanically cleaning toilets, urinals, or related sanitary fixtures, one cannot test their viability of its drain or the like, without resetting all the components, including the flush valve, of the flushometer, this resetting process exhausts time and materials, so if the test fails, the plumber needs to undo the flush valve before addressing whatever caused the test to fail.

There currently is no solution in the plumbing field to address this problem since there is no adapter for interconnecting a three-quarter inch threaded conduit, like a standard garden hose, to the water supply via the control stop, which has a one and one-quarter inch threaded coupling (to connect to the valve body assembly).

As can be seen, an adapter dimensioned and shaped to temporarily fluidly connect a handy water supply (by way, say, of a three-quarter inch threaded garden hose) to the commercial water supply (by way of the control stop) for testing the employability of a sanitary plumbing fixture prior to fully reassembling and fluidly connecting all the fixture to the overall system's commercial water supply.

SUMMARY OF THE INVENTION

The adapter is configured to fluidly connect a commercial water supply to a standard (e.g., ¾-inch) hose connection for testing and flushing the drain line or other aspects of sanitary plumbing fixtures. The present invention also allows other tradesmen to use the control stop as a water source, for instance tradesmen who are tiling, cleaning, performing Heating Ventilation and Air-Condition (HVAC), or just need running water without a traditional water source.

In one aspect of the present invention, a conduit adapter for forming a fluid connection between a standard garden hose and a control stop of a flushometer includes the following: a through bore extend between a first end and a second end of the conduit adapter; the first end comprising a cylindrical fitting; a hood shrouding approximately half of the cylindrical fitting; and the second end comprising a male threaded fitting dimensioned for a three-quarters of an inch female fitting.

In another aspect of the present invention, a conduit adapter for forming a fluid connection between a standard garden hose and a commercial control stop of a flushometer further includes the following: a circumferential channel recessed along the cylindrical fitting just inward of a distal end thereof; an O-ring nested in the circumferential channel, wherein approximately half of a length of the cylindrical fitting projects beyond a distalmost face of the hood, while approximately half of said length is shrouded by the hood; a threaded surface along an inward-facing surface of the hood, wherein said inward-facing surface is spaced apart from a portion of the cylindrical fitting it shrouds; a recessed surface along the distalmost face of the hood; and a valve access opening disposed between the hood and the second end, wherein a valve can be fluidly connected to the through bore, and wherein the cylindrical fitting provides a one and one-quarter inch threading.

In still yet another embodiment of the present invention, a method of testing a drain of a not-completely reinstalled flushometer includes the following steps: fluidly coupling the first end of the above conduit adapter to a coupling thread of a control stop of the flushometer, wherein the control stop is fluidly coupled to a commercial water supply; fluidly coupling the second end of the above conduit adapter to a three-quarter inch hose; and engaging the valve access opening of the above conduit adapter so that water selectively flows from an outlet of the three-quarter inch hose and into said drain.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Figure 1:
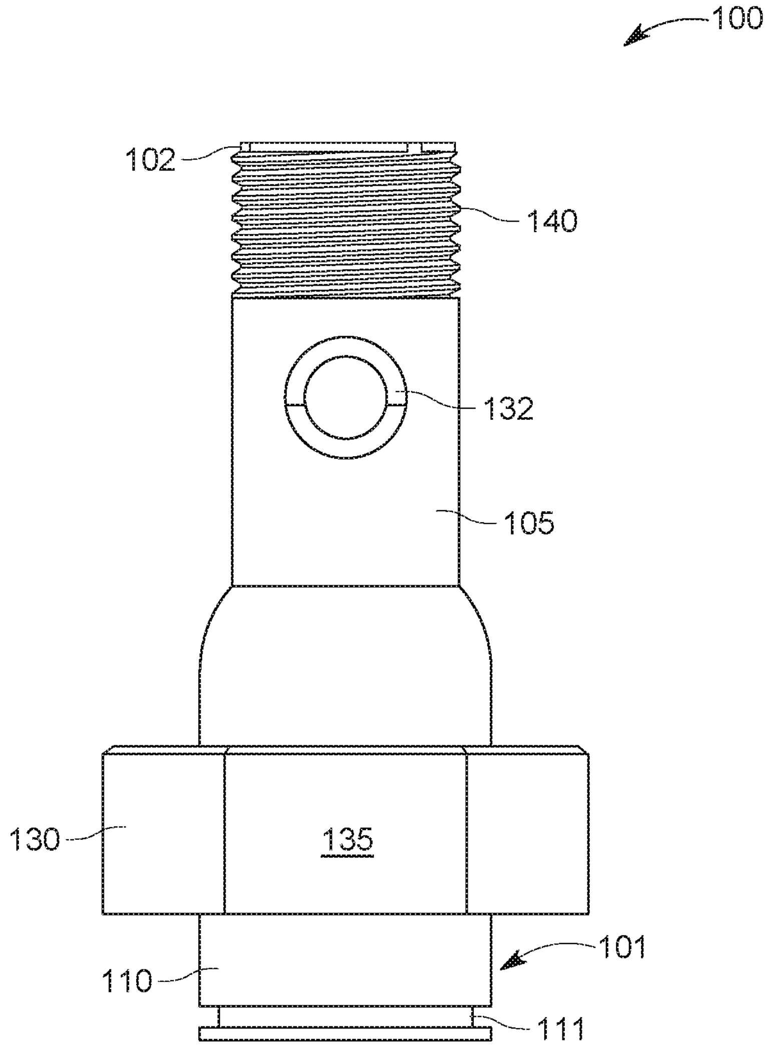
FIG. 1 is a front elevation view of a first exemplary embodiment of the present invention.
Figure 2:
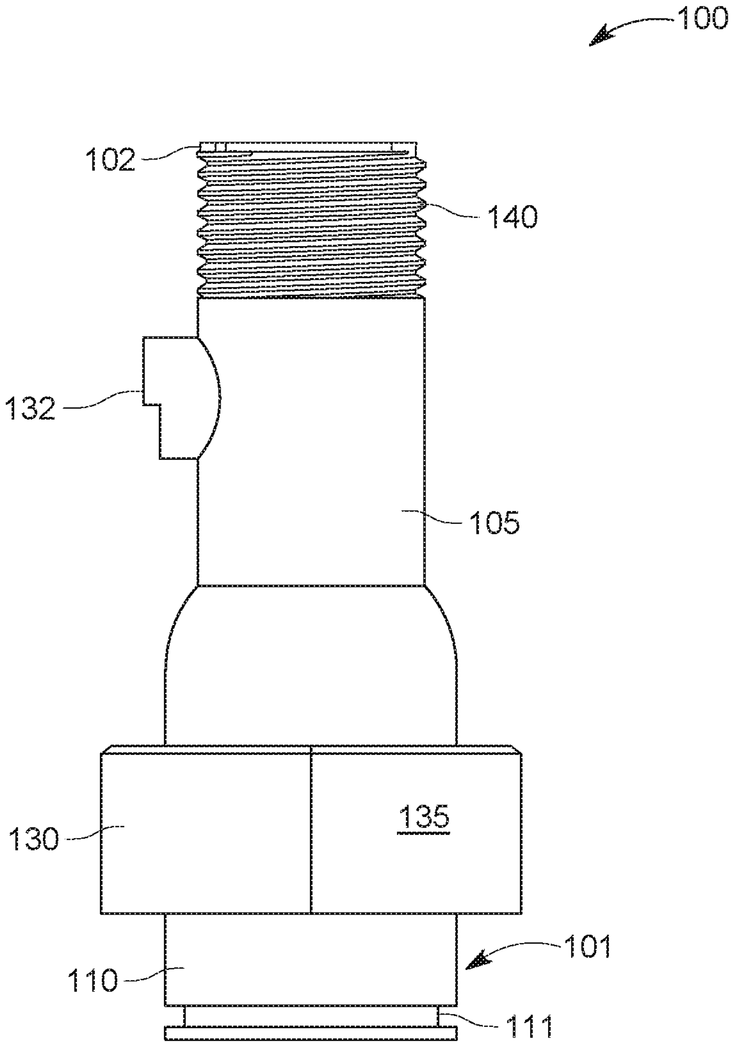
FIG. 2 is a side elevation view of the first exemplary embodiment of the present invention.
Figure 3:
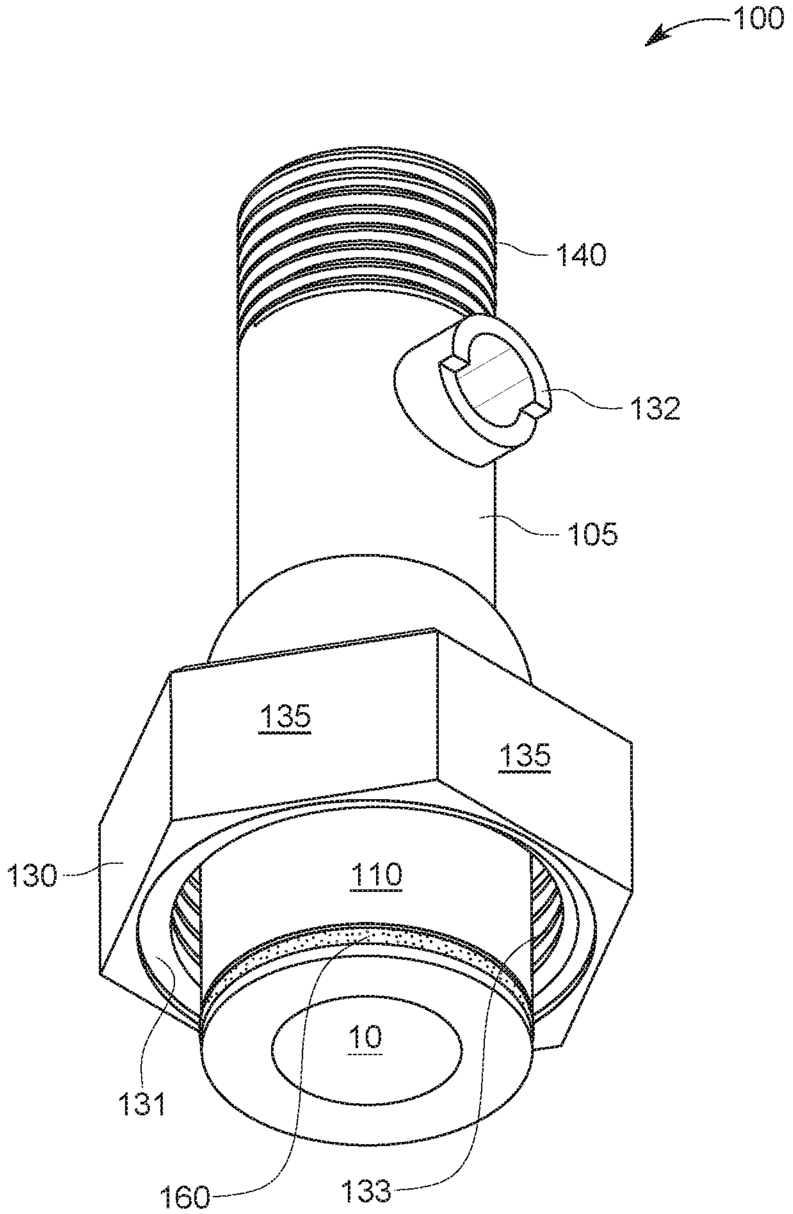
FIG. 3 is a bottom perspective view of the first exemplary embodiment of the present invention.
Figure 4:
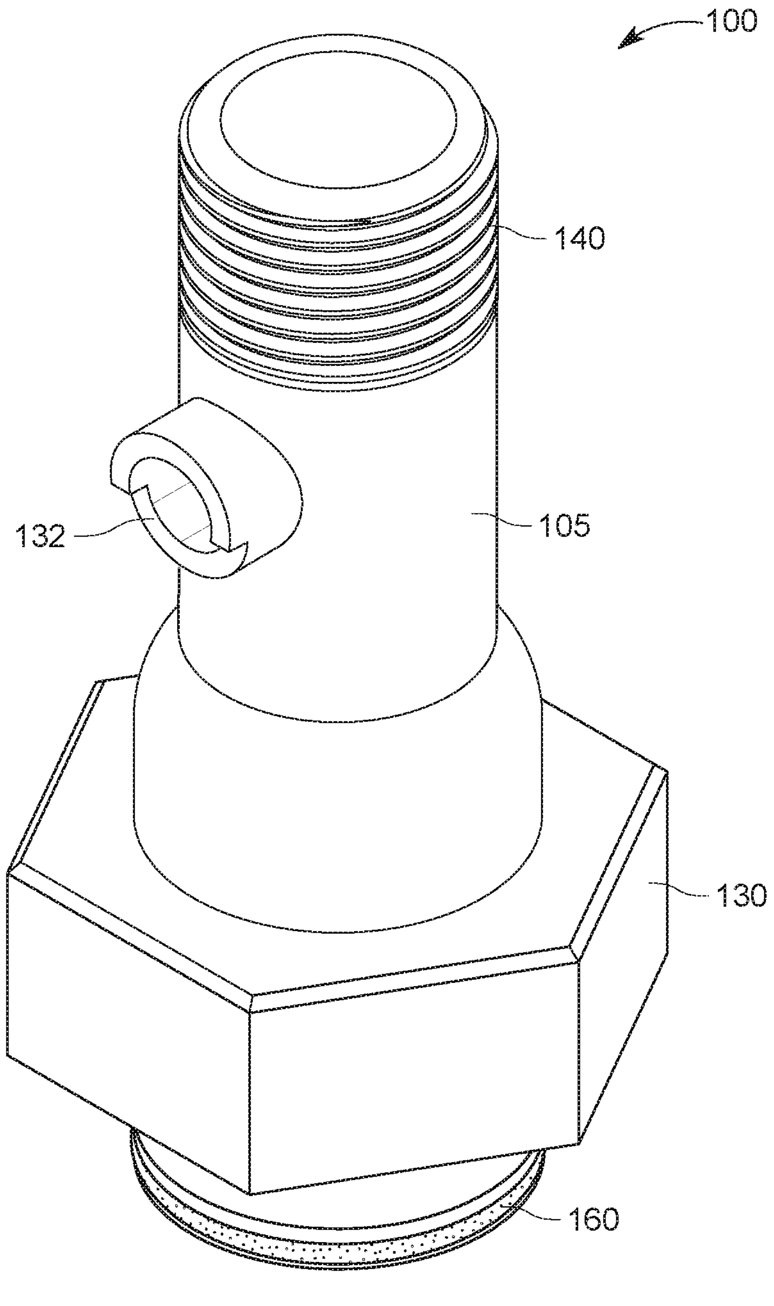
FIG. 4 is a top perspective view of the first exemplary embodiment of the present invention.
Figure 5:
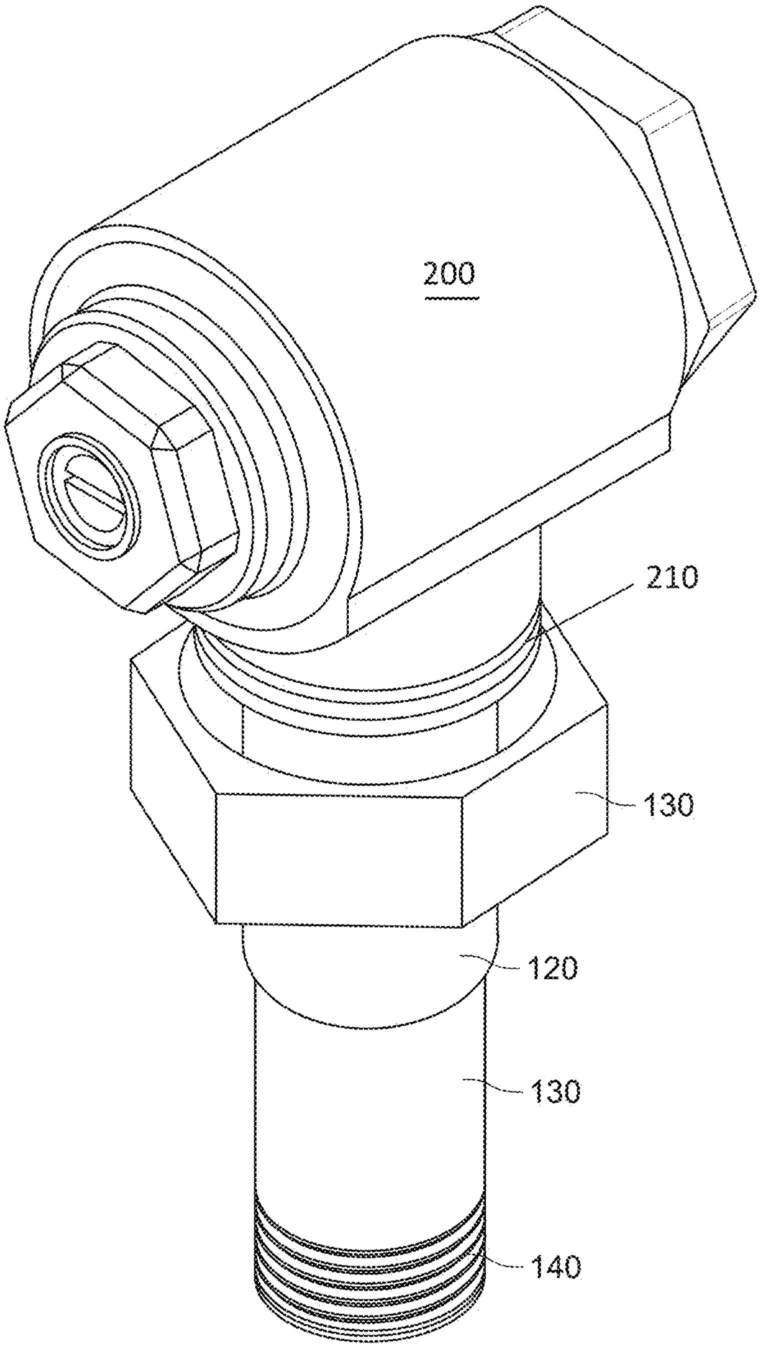
FIG. 5 is a top perspective view of the first exemplary embodiment of the present invention, shown in use.

Referring now to FIGS. 1 through 5, an adapter 100 dimensioned and configured to fluidly connect a control stop 200 of a flushometer to a three-quarter inch hose for testing sanitary plumbing fixtures of the flushometer prior to complete re-installation.

The adapter 100 extends from a first end 101 to a second end 102. The first adapter 100 is generally tubular with a through bore 10 through which water may flow between the first end 101 to the second end 102. Thus, this through bore forms part of the water flow path between the control stop 200 of the commercial water supply and a standard (¾") hose.

The first end 101 is dimensioned and shaped to fluidly engage the coupling threading 210 of a commercial water supply's control stop 200. The first end 101 provides a spigot fitting having a fitting portion 110 arranged for connecting to the complimentary male fitting portion provided by the coupling threading 210 of the supply's control stop 200, which is standardly one and one-quarter of an inch. The fitting portion 110 is generally cylindrical with a circumferential channel 111 for receiving an O-ring (not shown) to seal between the control stop 200. and the adapter 100.

A hood 130 may shroud approximately half of the fitting portion 110, wherein the hood 130 provides a structure spaced apart from the fitting portion 110 for approximately 50% of the fitting portion 110 length. Thus, the fitting portion 110 protrudes from the hood 130 for approximately half of its length.

The distal face of the hood 130 may provide a recessed surface 131. Along an interior surface 133 of the hood 130 threading is provided to facilitate a sealed connection with the control stop coupling threading 210. The hood 130 provides wrench flats 135 for further facilitating the attachment or detachment of a sealed connection.

The second end 102 provides a standard male fit 140 threading to allow connection to a complimentary female (¾") fitting provided on a standard garden hose (not shown).

Along the body 105 of the first adaptor 100, between the hood 130 and the second end 102 is a valve opening or access opening 132. The access opening 132 is for operatively associating with internal ball valve to control the flow of water, allowing users to stop the flow of water more effectively during the use of the adapter 100 instead of using the control stop. Another embodiment of the adapter 200 may have all the same components of the first adapter 100, such as a first end hood 130 and fitting portion 110 and second end male threading 140, but with no access opening (132) along the body of second adapter.

Either adapter 100 or 200 may be made of plastic, composite, resin, metal, or the like. Each O-Ring 160 may be made of rubber or other suitable material.

The first end of adapter 100 or 200 connects to a commercial stop supply spigot so that the nested O-ring 160 creates a seal when connecting to the stop supply spigot. The first end may have a circumferential channel recess 111 with a ring flange for nesting the O-ring 160. The second end of adapter 100 or 200 may be threaded to facilitate the functionality disclosed herein.

The adapter 100/200 enables a step-down transition from the size of the stop pipe down to a standard conduit size (e.g., ¾ inch), which would be dimensioned and sized for a standard female garden hose connector or other standard fluid couplers, thereby enabling the user to have a water source for performing testing on drains during and after auguring/snaking drain lines.

The prototype was made on a three-dimensional printer/resin printer. It can be produced by injection molding. There are also multiple ways to manufacture, with different materials. O-ring is available in the existing market. All elements are necessary. Elements that could be added include an internal ball valve that controls the water flow.

A method of using the present invention may include the following. The adapter 100/200 may be installed after removing the flush valve and other components and the toilet/urinal fixtures so that they are detached from the coupling threads 210 (which would operationally connect to the valve body assembly of the flushometer) of the control stop 200. Screw the adapter 100 onto the coupling threads 210 of the control stop 200 and turn the water on. This will provide the user with a water source to perform your auguring/snaking of the drain. It will also allow a user to check the drain after cleaning. Checking the drain before reinstallation of the fixture/components ensures a user will only have to pull and reset the fixtures once.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A conduit adapter comprising:

a through bore extending between a first end and a second end of the conduit adapter;

the first end comprising a cylindrical fitting sized such that a one and one-quarter of an inch threading can be threaded to an internally threaded hood portion of the conduit adapter;

the hood portion shrouding approximately half of the cylindrical fitting; and the second end comprising a male threaded fitting dimensioned for a three-quarters of an inch female fitting.

2. The conduit adapter of claim 1, further comprising a circumferential channel recessed along the cylindrical fitting just inward of a distal end thereof.

3. The conduit adapter of claim 2, further comprising an O-ring nested in the circumferential channel.

4. The conduit adapter of claim 1, wherein approximately half of a length of the cylindrical fitting projects beyond a distalmost face of the hood, while approximately half of said length is shrouded by the hood.

5. The conduit adapter of claim 4, further comprising a threaded surface along an inward-facing surface of the hood, wherein said inward-facing surface is spaced apart from a portion of the cylindrical fitting it shrouds.

6. The conduit adapter of claim 5, further comprising a recessed surface along the distalmost face of the hood.

7. A method of testing a drain of a not-completely reinstalled flushometer, comprising:

fluidly coupling the first end of the conduit adapter of claim 1 to a coupling thread of a control stop of the flushometer, wherein the control stop is fluidly coupled to a commercial water supply;

fluidly coupling the second end of the conduit adapter of claim 1 to a three-quarter inch hose; and engaging a valve access opening of the conduit adapter of claim 1 so that water selectively flows from an outlet of the three-quarter inch hose and into said drain.

8. A conduit adapter comprising:

a through bore extending between a first end and a second end of the conduit adapter;

the first end comprising a cylindrical fitting;

a hood shrouding approximately half of the cylindrical fitting;

the second end comprising a male threaded fitting dimensioned for a three-quarters of an inch female fitting; and a valve access opening disposed between the hood and the second end, wherein the valve access opening enables a valve fluidly connecting to the through bore for selectively controlling flow therethrough.

9. The conduit adapter of claim 8, further comprising a circumferential channel recessed along the cylindrical fitting just inward of a distal end thereof.

10. The conduit adapter of claim 9, further comprising an O-ring nested in the circumferential channel.

11. The conduit adapter of claim 8, wherein approximately half of a length of the cylindrical fitting projects beyond a distalmost face of the hood, while approximately half of said length is shrouded by the hood.

12. The conduit adapter of claim 11, further comprising a threaded surface along an inward-facing surface of the hood, wherein said inward-facing surface is spaced apart from a portion of the cylindrical fitting it shrouds.

13. The conduit adapter of claim 12, further comprising a recessed surface along the distalmost face of the hood.

* * * * *